United States Patent [19]

Richards

[11] Patent Number: 4,915,534

[45] Date of Patent: Apr. 10, 1990

[54] SCREW JOINT CONNECTION BETWEEN METAL MEMBERS

[75] Inventor: Peter S. Richards, Issaquah, Wash.

[73] Assignee: Progressive Fastening, Inc., Seattle, Wash.

[21] Appl. No.: 346,417

[22] Filed: May 1, 1989

Related U.S. Application Data

[63] Continuation-in-part of Ser. No. 47,730, May 6, 1987, Pat. No. 4,826,343.

[51] Int. Cl.[4] ................................................ F16B 7/08
[52] U.S. Cl. ................................... 403/189; 403/245; 248/188; 108/156
[58] Field of Search .............. 403/189, 192, 245, 246, 403/264, 260; 248/188; 108/156

[56] References Cited

U.S. PATENT DOCUMENTS

| | | | |
|---|---|---|---|
| 1,884,491 | 10/1932 | Ziemann | 403/245 |
| 2,730,419 | 1/1956 | Watrous et al. | 310/110 |
| 2,809,876 | 10/1957 | Huff | 311/114 |
| 3,506,227 | 4/1970 | Jenkins | 248/59 |
| 4,074,941 | 2/1978 | Jablonski | 403/260 |

FOREIGN PATENT DOCUMENTS 2011007  7/1979  United Kingdom ................ 403/258

Primary Examiner—Andrew V. Kundrat
Attorney, Agent, or Firm—Delbert J. Barnard

[57] ABSTRACT

A shank portion (32) of a bolt (28) fits through an enlarged opening (22) in a base member (14). A barrier washer 36 is located between base member (14) and a support member (12). A weld bead (30) and a central part (37) of washer (36) fit within a shallow socket (24) in a first side of the base member (14). The washer (36) is placed against support member (12) and the first side (18) of the base member (14) is placed against washer (36). The tubular end (48) of a post member (10) is moved endwise into an trepan groove (26) and the post (10) is rotated to first make and then tighten a screw connection (34, 40) between an insert (38) in the post member (10) and a threaded portion (34) of the bolt (28). The support member (12), the bolt (b 28) and insert (38) are made from a hard metal. The base member (12) and the post member (10) are constructed from a soft metal.

18 Claims, 2 Drawing Sheets

U.S. Patent Apr. 10, 1990 Sheet 1 of 2 4,915,534
Fig. 2
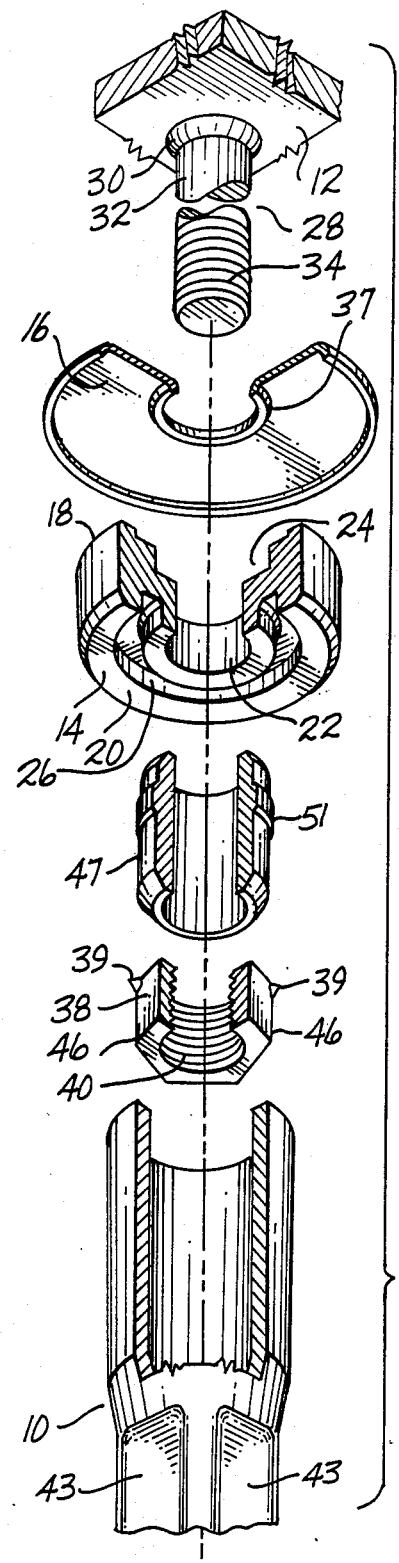
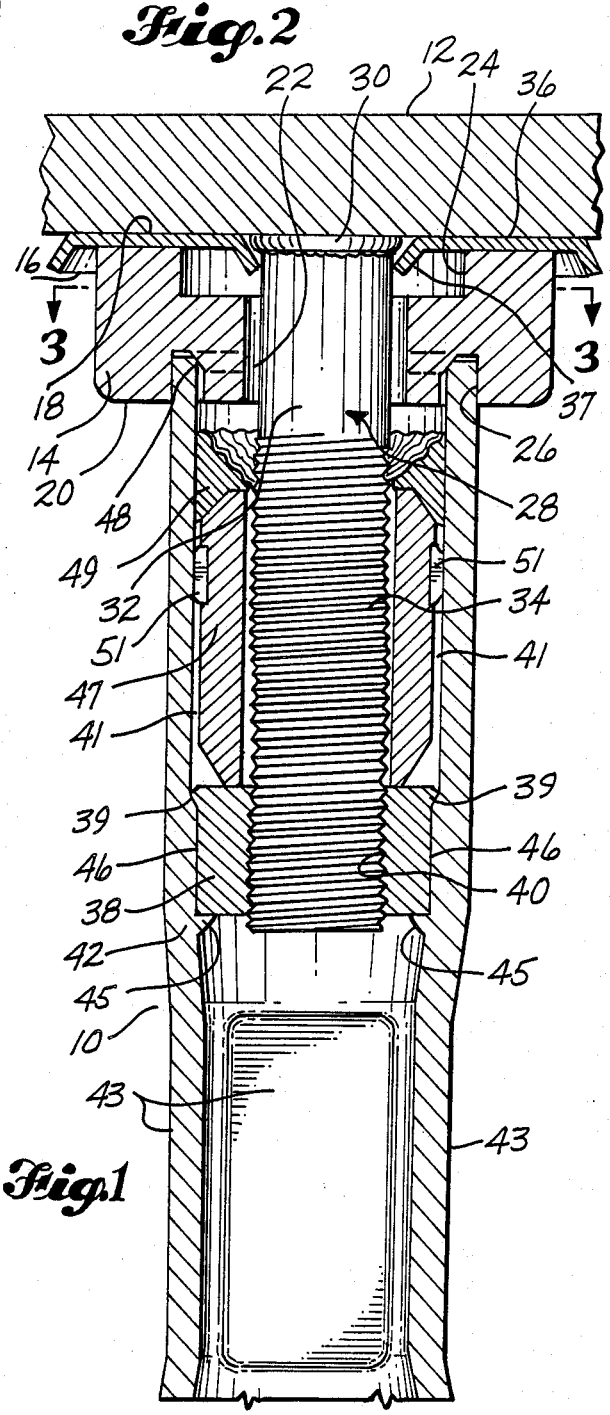
Fig. 1

SCREW JOINT CONNECTION BETWEEN METAL MEMBERS

RELATED APPLICATION

This is a continuation-in-part of my co-pending application Ser. No. 07/47,730, filed May 6, 1987, now Pat. No. 4,826,343 and entitled "Hard Metal Screw Joint Connection Between Soft Metal Members."

TECHNICAL FIELD

This invention relates to screw joints and in particular to the provision of a hard metal screw joint between two members, one of which is a soft metal member.

BACKGROUND ART

The invention was made as a part of an effort to develop a support leg for a light fixture of the like which can be screw connected at its upper end to a ceiling or other overhead structure. It is known to weld such a support leg at its upper end to a ceiling structure and then weld a cross bar to the lower end of the support leg and then connect the lighting fixture to the cross bar. A problem with this type of construction is that if it becomes necessary to move the position of the light fixture for any reason, the support legs must be destructively removed.

It is generally known to provide a support leg which is connected by a screw joint to a stud which depends from a ceiling structure. An example of this type of arrangement is disclosed by U.S. Pat. No. 3,517,901, granted Apr. 14, 1970 to John C. Jenkins.

Some installations require the use of relatively soft metal materials, such as aluminum or aluminum alloys, for example. It is an object of the present invention to provide between a soft metal post member and a metal support member, which may be a hard metal, a joint which is laterally braced and includes a threaded connection between two hard metal members.

DESCRIPTION OF THE INVENTION

In accordance with the invention, a soft metal base member is provided of a type including a first side, a second side, and an opening extending between the first and second sides. A socket may be formed in the first side and a trepan groove is formed in the second side, concentrically surrounding the opening. The shank of a hard metal bolt extends through the opening. The shank includes a threaded portion which projects beyond the second side of the base member. A soft metal post member is provided which has a tubular end sized to fit within the trepan groove. A hard metal insert is located within said post member. The insert has a central opening with threads constructed to make threaded engagement with the threads on the bolt. The insert is secured within the post member. The post member is moved towards the base member to bring together an end of the threaded opening in the insert and the threaded end of the bolt, and align the tubular end of the post member with the annular groove. Then, the post member is rotated for the purpose of threading the insert onto the bolt. The post member is rotated until the screw joint is tight and the tubular end of the post member is tight within the trepan groove.

Preferably, the tubular end has a sloping end surface which serves to cam the tubular end into the trepan groove if such tubular end is off round. The threaded members are constructed from a hard metal which is not easily damaged by a joint tightening rotation. The fit of the tubular end into the trepan groove serves to laterally brace the joints so as to increase its ability to withstand sideloads applied on the post member away from the joint.

Other more detailed aspects of the invention, including ways of retaining the hard metal insert within the soft metal post member, are hereinafter described as a part of the description of the invention. Thus, with respect to the various details that are claimed, the description of the best mode also constitutes a portion of the description of the invention.

These and other features, advantages and characteristics of the invention will all be apparent from the various embodiments of the invention which are illustrated and described below in connection with the drawing.

BRIEF DESCRIPTION OF THE DRAWING

Like reference numerals are used to designate like parts throughout the several views of the drawing, and:

FIG. 1 is an exploded isometric view of the joint construction of the invention;

FIG. 2 is an axial sectional view of the joint construction in an assembled condition, with some parts being shown in elevation;

BEST MODE FOR CARRYING OUT THE INVENTION

Figure 3:
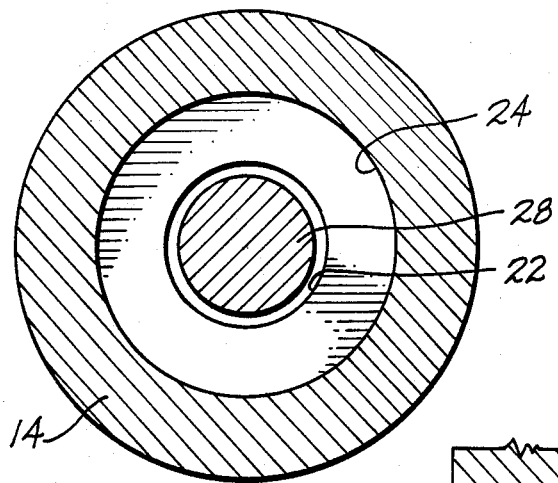
FIG. 3 is a cross-sectional view taken substantially along line 3—3 of FIG. 2.

FIGS. 1 and 2 show an upper end portion of a post member 10. The post member 10 may serve to connect a light fixture or other object to a support member 12 which may be a part of a ceiling. The configuration of the post member 10 below its upper end portion is not important to this invention and for that reason it has not been illustrated.

Member 12 may be made from a relatively hard metal, such as mild steel, for example. Post member 10 is made from a soft metal material, e.g. aluminum. In accordance with the invention, a soft metal base member 14 is provided which is positioned between the support member 12 and the post member 10. By way of example, member 14 is shown to be circular in form.

Base member 14 has a first side 18, shown in the illustrated embodiment to be directed upwardly, and a second side 20, shown in such embodiment to be directed downwardly. An opening 22 extends through base member 14 between the first and second sides 18, 20. A shallow socket 24 is formed within the first side 18. An trepan groove 26 is formed within the second side 20. Trepan groove 26 concentrically surrounds the opening 22. Socket 24 is also concentric with the opening 22.

A hard metal bolt 28 is provided. It includes an upper end 30 and a shank 32 which extends through the opening 22. Shank 32 includes a threaded portion 34 which projects beyond the second side 20 of member 14. The upper end is welded to the member 12 by a weld bead 30. The opening 22 is substantially larger in diameter than shank 32. This is so that there is no contact between shank 32 and the member 14.

By way of typical and therefore nonlimitive example, bolt 28 is constructed from mild steel. A stainless steel barrier washer 36 is located between members 12 and 14. This washer 36 and the no contact between shank 32 and member 14 prevents electrolysis. The socket 24 is sized to receive the weld bead 30 and a center portion 37 of the washer 36. Washer 36 may be constructed from stainless steel or some other material which will substantially prevent galvanic corrosion, i.e. electrolysis.

Preferably, post 10 is reduced in diameter starting at location 42 and continuing to a pattern of wrench flats 44. In accordance with the invention, a hard metal insert 38 is fixed in position within the upper end portion of post member 10. Insert 38 may be a nut as illustrated. It includes a threaded opening 40 which extends through it, from one end to the other. The threads 40 complement the threads on the bolt shank 34. The trailing corner portions of insert 38 are deformed to create lateral projections 39. The insert 38 is placed into the upper end of the post member 10 and pushed downwardly. The projections 39 cut longitudinal grooves 41 in the inner surface of tubular wall 10 as insert 38 moves downwardly. The insert 38 is moved downwardly until its leading corner point 46 moves into the sidewall material of the reduced diameter region of member 10, displacing regions of metal 45. This forms a structural interlock between the insert 38 and the post member 10, functioning to resist both rotation and downward movement of the insert 38 relative to the post member 10. The interfit of the projections 39 into the sidewall material of post 10 also resists rotation of insert 38 relative to post 10.

The insert 38 may be anchored in place endwise by inserting into post 10, above insert 38, a sleeve 47 of a material that is weldable to post member 10. The weld bead 49 becomes an integral part of the sidewall of the tubing 10 and forms an end stop for the insert 38 and the sleeve 47, preventing them from moving endwise upwardly.

Post member 10 includes a tubular end portion 48 which is sized to be received within the trepan groove 26.

The joint is made by a workman carrying the post member 10 to the location of the bolt 28 and moving its tubular end 48 upwardly to start the threads 34 on the bolt 28 into the threads 40 in the insert 38. Then, the post member 10 is rotated for the purpose of screwing the parts together. As the insert 38 travels along the threads 34 on the bolt 28, the tubular end 48 of post member 10 moves into the trepan groove 26. Rotation is continued until the tubular end 48 is tight within the groove 26.

Preferably, the tubular end 48 is chambered to provide a beveled surface that is directed towards the trepan groove 26. In the illustrated embodiment the beveled surface 50 is formed adjacent the inside surface of tubular end 48. It and a substantially squared end surface 52 form the end of tubular end 48. In similar fashion, the trepan groove 26 includes a pair of sidewalls 54, 56, and an endwall having a slanting portion 58 and a substantially squared portion 60. The slanting portion 58 makes a slanting angle with the sidewall 56.

The most important reason for use of a beveled surface 58 at the inside corner of the trepan 26, and a beveled surface 50 at the inner diameter of the tubular member 10, is for the purpose of mechanically camming the tube 10 radially outwardly into tight contact with the outside diameter 54 of the trepan 26. In preferred form, beveled surface 58 is constructed to be wider (or deeper) than beveled surface 50. This will cause a radially outward displacement on member 10 as surfaces 50, 58 are moved together during tightening of the screw joint. The mating surfaces 50, 58 cause an expansion of the tube 10, increasing its outside diameter until no clearance exists between it and the sidewall 54. This elimination of all clearances between tube 10 and wall 54 also eliminates a space in which part 10 could move in response to vibration forces. A live clamp force is developed between the outer diameter of tube 10 and wall 54 which functions to resist the effects of shock loads and vibration forces.

Figure 4:
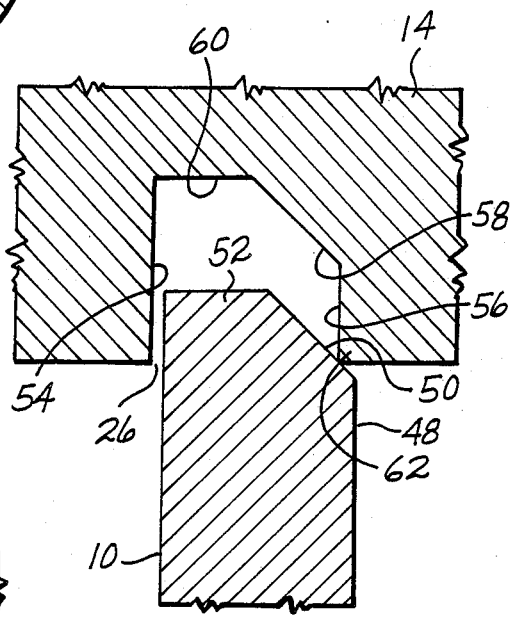
FIG. 4 is an enlarged scale view of a fragment of the tubular end of the support post making an off line entry into the annular groove in the base member.
Figure 5:
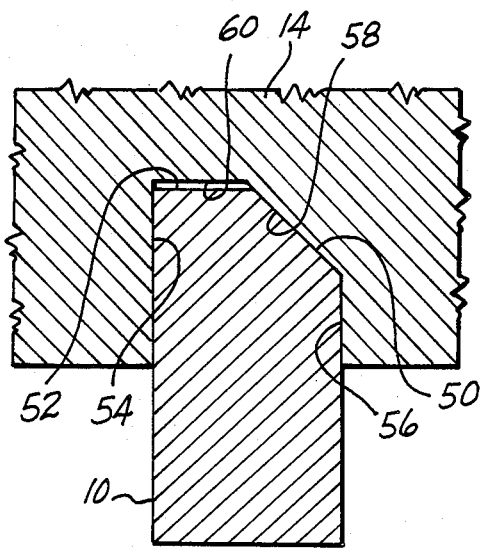
FIG. 5 is a view like FIG. 5 but showing the tubular end inside the trepan groove.

There is a variance in both inside and outside diameters of tubing made from soft materials such as aluminum alloys. Also, the tubing is not exactly circular or "round" and the amount that it is off "round" varies from each piece of tubing to the next. FIG. 4 shows a situation which could exist if the tubular end 48 is off round. As shown by FIGS. 4 and 5, the beveled surface 50 serves to cam the tubular end 48 into the trepan groove 26. The tubular end does not enter directly into the trepan groove 26. Rather, its beveled surface 50 first makes contact with a corner 62. This contact between surface 50 and corner 62 causes the tubular end 48 to be directed into the trepan groove 26 as the post member 10 is being rotated. The metal used for member 10 is soft enough that it will deform as needed so that as the post member 10 is rotated the tubular end 48 will move into and fill the trepan groove 26. FIG. 5 shows the end surfaces 50, 52 of the tubular end 48 bottoming against the end surfaces 58, 60 of the base member 14.

The tight fit of the tubular end 48 within the trepan groove 26 serves to brace the post member 10 against sideways movement at its upper end in response to sideways forces applied against the post member 10 at a location spaced from support member 12.

As will be appreciated, numerous changes can be made in the specific details of the joint construction without departing from the basic principles of the invention. For example, the beveled surface 50 and the slanting surface 58 can be moved to the radially outer sides of the tubular end 48 and trepan groove 26, respectively. The insert can be different in form and anchored differently. Likewise, the anchor means used for anchoring the bolt 28 against rotation relative to base member 14 can vary.

The terms "hard metal" and "soft metal" are relative terms but a person skilled in the art will know what is meant by these terms. A screw joint between hard metal components is desired and the problem addressed by the invention is to provide a screw joint between members, one of which is constructed from soft metal. Accordingly, the term "hard metal" is used to refer to a metal that can provide a superior screw joint to the second type of metal used which is referred to as "soft metal."

The mechanical joint of the invention eliminates the problem experienced by welded aluminum joints losing strength because of the welding heat removing a temper state from the support post. The use of the mechanical joint allows an aluminum support arm to be affixed to a stainless steel or carbon steel structure.

An aluminum support post 10 is processed in the following manner. Firstly, the material is received in a hardened condition, as a length of tubing. The tubing is cut to provide a support post 10 of the desired length. Next, the cut post 10 is annealed to soften it. It is shaped to form the wretch flats 43. Next the nut 38 is press fit into the tube 10. The trailing corners of the peaks 46 may be pinched to form radially outwardly extending projections 39. The tube 10 is gripped at the wrench flats 43 to hold it in position. Nut 38 is then pushed into the end of the tube until it seats against the box section. As the nut 38 travels inwardly the projections 39 deform grooves in the tubing 10. The interfit of the projections 39 in these grooves resists relative rotation between nut 38 and tube 10. Then, the aluminum member 47 is installed. Preferably, both ends of the aluminum member 47 are beveled as illustrated. The bevel at the leading end makes it easier to guide the member 47 into the tube 10. The fit of member 47 in the tube 10 is preferably an interference fit. The member 47 is constructed to include outstanding longitudinal splines. These splines deform their way into the tube material. Next the member 47 is welded to the tube 10. The bevel at the opposite end receives some of the fillet weld used to secure member 47 in place. Next, the member 10 is heat treated back up to a full hard condition. Then the end of the tube 10 is dressed, including by forming the forty-five degree (45°) bevel at its inside diameter. The weld is dressed, if necessary, to prevent any interference between it and member 14.

It is to be understood that the illustrated embodiments are presented for examples only. The scope of the invention is not to be determined by the illustrated embodiments but rather by the appended claims, interpreted in accordance with established rules of patent claim interpretation, including use of the doctrine of equivalents.

What is claimed is:

1. A joint construction, comprising:
    a hard metal support member;
    a soft metal base member including a first side defected towards said support member, a second side, an opening extending between said first and second sides, and a trepan groove in said second side concentrically surrounding said opening;
    hard metal bolt extending from said support member and having a shank extending through said opening, said shank including a threaded portion which projects beyond the second side of said base member;
    a soft metal post member having a tubular end sized to fit within said trepan groove;
    a hard metal insert located within and secured to said post member, said insert having a central opening with threads constructed to make threaded engagement with the threads on said bolt; and
    wherein in use the post member is moved towards the base member and its tubular end is placed within said trepan groove and the threads of the bolt are mated with the threads in the insert, and then the post member is rotated for the purpose of making a threaded connection between the bolt and the insert and tightening such connection until the tubular end of the post member is tight within said trepan groove.

2. A joint construction according to claim 1, wherein the trepan groove in the base member includes a pair of sidewalls and an endwall extending between the sidewalls, with at least a portion of said endwall making a slanting angle with one of the sidewalls and wherein the tubular end of the post member includes a beveled edge which makes contact with the slanting surface of the trepan groove.

3. A joint construction according to claim 2, wherein the end surface of the trepan groove includes a substantially squared portion and the tubular end of the post member includes a substantially squared portion, wherein when the tubular end of the post member is placed within the trepan groove the beveled surface on the tubular end of the post member mates with the slanting surface of the trepan groove and the substantially squared end surface of the tubular end of the post member mates with the substantially squared portion of the end surface of the trepan groove.

4. A joint construction according to claim 1, wherein the post member includes a reduced diameter portion axially inwardly of the post member from the insert and such reduced diameter portion prevents axial inward movement of the insert, and means is provided at the opposite end of the insert to prevent its movement out from the post member.

5. A joint construction according to claim 2, wherein the post member includes a reduced diameter portion axially inwardly of the post member from the insert and such reduced diameter portion prevents axial inward movement of the insert, and means is provided at the opposite end of the insert to prevent its movement out from the post member.

6. A joint construction according to claim 3, wherein the post member includes a reduced diameter portion axially inwardly of the post member from the insert and such reduced diameter portion prevents axial inward movement of the insert, and means is provided at the opposite end of the insert to prevent its movement out from the post member.

7. A joint construction according to claim 1, wherein the bolt is secured to said support member.

8. A joint construction according to claim 7, wherein said bolt is welded to said support member and a socket is formed in the first side of the base member into which the weld extends.

9. A joint construction according to claim 7, wherein said opening in said base member has a diameter sufficiently larger than the bolt diameter that there is no contact between the bolt and the base member.

10. A joint construction according to claim 1, wherein said opening in said base member has a diameter sufficiently larger than the bolt diameter that there is no contact between the bolt and the base member.

11. A joint construction according to claim 1, further comprising a barrier washer between the support member and the base member of a material which substantially prevents electrolysis between the support member and the base member.

12. A joint construction according to claim 11, wherein said opening in said base member has a diameter sufficiently larger than the bolt diameter that there is no contact between the bolt and the base member.

13. A joint construction according to claim 1, wherein said insert includes an outer sidewall presenting a pattern of anchor elements to the post member and axially inwardly of the insert the post member is reduced in diameter, and the insert is forceably moved axially into the reduced diameter portion so that the means at its periphery digs into the post material to interlock with the insert and hold the insert against both rotation and inward axial movement relative to the post member.

14. A joint construction according to claim 13, further comprising a sleeve in the post member axially outwardly of the insert, said sleeve being constructed from a material that can be welded to the post member, and a weld bead at the outer end of the sleeve member, connecting the sleeve member to the post member.

15. A joint construction according to claim 13, wherein said bolt is welded to said support member and a socket is formed in the first side of the base member into which the weld extends.

16. A joint construction according to claim 15, wherein said opening in said base member has a diameter sufficiently larger than the bolt diameter that there is no contact between the bolt and the base member.

17. A joint construction according to claim 16, further comprising a barrier washer between the support member and the base member of a material which substantially prevents electrolysis between the support member and the base member.

18. A joint construction according to claim 13, wherein the trepan groove in the base member includes a pair of sidewalls and an endwall extending between the sidewall, with at least a portion of said endwall making a slanting angle with one of the sidewalls and wherein the tubular end of the post member includes a beveled edge which makes contact with the slanting end surface of the trepan groove.

* * * * *

UNITED STATES PATENT AND TRADEMARK OFFICE
CERTIFICATE OF CORRECTION

PATENT NO. : 4,915,534
DATED : April 10, 1990
INVENTOR(S) : Peter S. Richards

It is certified that error appears in the above-identified patent and that said Letters Patent is hereby corrected as shown below:

ON TITLE PAGE:
In the Abstract, the 3rd line from the bottom, "(b 28)" should be -- (28) --.

Column 3, line 54, "chambered" should be -- chamferred --.

Column 5, line 1, "wretch" should be -- wrench --.

Claim 1, column 5, lines 36 and 37, "defected" should be -- directed --.

Claim 1, column 5, line 41, before "hard", insert -- a --.

Signed and Sealed this

Twenty-second Day of October, 1991

Attest:

HARRY F. MANBECK, JR.

Attesting Officer

Commissioner of Patents and Trademarks